April 17, 1928.
B. S. WEINFIELD
1,666,433
SYSTEM OF ELECTRIC DISTRIBUTION
Filed June 28, 1926
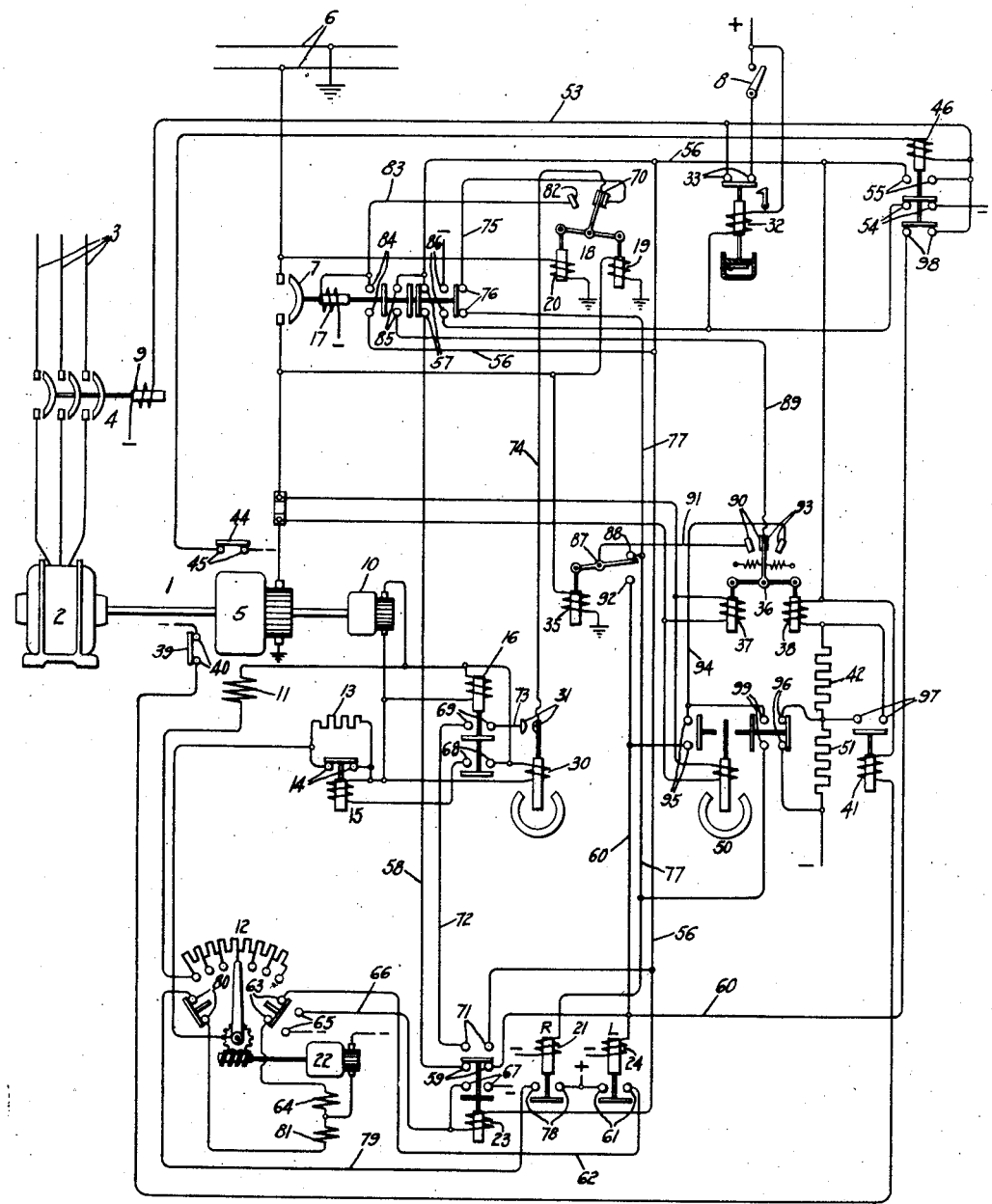
Inventor:
Benjamin S. Weinfield,
by *Alexander S. [signature]*
His Attorney.

Patented Apr. 17, 1928.

1,666,433

UNITED STATES PATENT OFFICE.

BENJAMIN S. WEINFIELD, OF SCHENECTADY, NEW YORK, ASSIGNOR TO GENERAL ELECTRIC COMPANY, A CORPORATION OF NEW YORK.

SYSTEM OF ELECTRIC DISTRIBUTION.

Application filed June 28, 1926. Serial No. 118,894.

My invention relates to systems of electric distribution, and its object is to provide an improved arrangement for automatically controlling the connections and operation of a source of current whereby it is connected to a load circuit only under certain predetermined conditions, and whereby its output is limited to a safe value under abnormal load conditions.

My invention will be better understood from the following description taken in connection with the accompanying drawing, and its scope will be pointed out in the appended claims.

In the accompanying drawing, which shows diagrammatically a system of electric distribution embodying my invention, 1 represents a rotary transformer comprising an alternating current motor 2 which is adapted to be connected to an alternating current supply circuit 3 by means of a suitable circuit breaker 4 and a direct current generator 5 which is adapted to be connected to a direct current distribution circuit 6 by a suitable circuit breaker 7. The circuit 6 is arranged to be supplied by other sources not shown.

As shown, the motor 2 is arranged to be started by being connected directly across the supply circuit. Preferably in actual practice, however, the motor is started in any well known manner, examples of which are well known in the art, but since my invention does not relate to this feature it is deemed unnecessary to complicate the drawing by showing this feature in detail.

Any suitable means, examples of which are well known in the art, may be provided for effecting the closing of the circuit breaker 4 to start the motor 2. As shown in the drawing, a hand switch 8 is provided which, when closed, effects the completion of the circuit of the closing coil 9 of the circuit breaker 4 to connect the motor 2 directly across the supply circuit 3.

The generator 5 is provided with a direct connected exciter 10 which is connected to the field winding 11 of the generator in series with a motor operated rheostat 12 and a resistor 13. The resistor 13 is short-circuited by contacts 14 of a relay 15 until the exciter voltage reaches a high enough value to cause a voltage relay 16 connected across the brushes of the exciter 10, to close its contacts.

The circuit breaker 7 is provided with a closing coil 17 which is arranged to be closed when the voltage of the generator 5 is of the correct polarity and slightly higher than the voltage across the load circuit 6. For accomplishing this result a balance relay 18 is provided which has two opposing coils 19 and 20 respectively responsive to the voltages of the generator 5 and the load circuit 6. When the generator voltage is higher than the load circuit voltage the relay 18 closes contacts 82 in the circuit of the closing coil 17. When the generator voltage is less than the load circuit voltage prior to the closing of the circuit breaker 7, a circuit is completed by the relay 18 through contacts 70 for the raising relay 21, which in turn completes a circuit for the motor 22 of the motor operated rheostat 12 in the generator field circuit so as to increase the generator excitation, in order to increase the generator voltage. These circuits for the raising relay 21 and the closing coil 17, however, are completed only after the rheostat has first been moved to its full resistance position, in which position, a circuit is completed for a control relay 23 which when energized completes a locking circuit for itself which is independent of the position of the rheostat 12, and closes contacts in the circuit of the closing coil 17. In order to insure that the rheostat 12 is moved to its full resistance position when the transformer 1 is started, a circuit is completed for the lowering relay 24, which in turn completes a circuit for the motor 22 of the motor operated rheostat so as to increase the amount of resistance in the generator field circuit, when the starting switch 8 is closed and the circuit breaker 7 is open. The purpose of providing such an arrangement is to prevent the circuit breaker 7 from closing with too great a difference in voltage between the generator and load circuit.

For controlling the closing coil 17 so that it is not energized unless the generator has a certain polarity, a polarized relay 30 is provided the coil of which is connected across the brushes of the exciter 10. The contacts 31 of the polarized relay are in the circuit of the closing coil 17 and are closed only when the exciter has a certain polarity. It will be observed that since the generator receives its excitation from the exciter the polarities of the two machines will always be the same. The advantage in using the exciter polarity is that the voltage of the exciter remains substantially constant while the transformer is in operation whereas under abnormal load conditions the voltage of the generator is subject to a wide variation. Therefore when the voltage coil of the polarized relay is connected across the exciter voltage in the system of the type shown in the drawing, it has to be designed to operate only in response to a substantially constant voltage.

32 represents a time delay relay which is arranged to be deenergized in response to the closing of starting switch 8 and to be energized again when circuit breaker 7 closes. The relay 32 is designed in any suitable manner so that if the time that elapses between its deenergization and its subsequent energization exceeds a certain amount the relay opens its contacts 33 and thereby effects the permanent disconnection of the transformer from both the supply and load circuits until the relay 32 is manually reset.

For controlling the output of the generator after it is connected to the load circuit a contact making voltmeter 35 and a contact making ammeter 36 are provided for controlling the circuits of the raising and lowering relays 21 and 24 so as to maintain the voltage of the load circuit constant until the current output reaches a predetermined value and then maintain the current output at said predetermined value. In order to protect the rotary transformer against excessive over currents which do not damage the machine if they last momentarily but which would if the machine continued to supply them indefinitely, suitable means are provided for varying the setting of the contact making ammeter 36 so as to change the value at which the current output is maintained constant. As shown this result is obtained by constructing the contact making ammeter 36 as a differential relay comprising a winding 37 which is so connected that it is energized in accordance with the current output of the generator and an opposing winding 38 which is energized from any suitable source of current of constant voltage, and providing means for varying the amount of current through the opposing winding 38 in accordance with a predetermined abnormal condition of the machine 1. As shown this last mentioned means is a temperature responsive means which responds to the temperature of the machine 1. As shown this temperature responsive means comprises a suitable thermostat 39 which is placed in close proximity to the generator 5 so as to be affected by the temperature thereof. The thermostat 39, when heated to a predetermined temperature, opens contacts 40 in the circuit of a control relay 41 which in turn controls a short circuit around a resistor 42 in the circuit of the winding 38 of the contact making ammeter 36. It will be observed therefore that if the current through the generator is such as to raise its temperature to a predetermined value a resistor 42 is inserted in series with the winding 38 of the contact making ammeter 36. This changes the setting of the relay 36 so that the relay holds the current output constant at a lower value since it takes a smaller current through the winding 37 to balance the relay 36.

In order to protect the machine in case the temperature of the machine exceeds a still higher value another temperature responsive device 44 is provided which, when it opens its contacts 45, opens the circuit of a control relay 46, which in turn opens the circuit of the closing coil 17 of the circuit breaker 7 to disconnect the rotary transformer from load circuit until the machine cools down.

In order that the output of the rotary transformer 1 may be maintained below a predetermined value in case it operates invertedly a reverse current relay 50 is provided which is arranged to reverse the connections of the raising relay 21 when the current through the generator reverses so that when the current input into the generator 5 when operating as a motor exceeds a predetermined amount the contact making ammeter effects the operation of the motor operated rheostat 12 to increase the excitation of the generator and thereby decreases the load thereon.

In order that the input into the generator when operating as a motor may be limited to a smaller value than the output when it is operating as a generator, the relay 50 is arranged to insert a resistor 51 in the circuit of the opposing coil 38 of the contact making ammeter 36 when the rotary transformer is operating invertedly.

The operation of the system shown is as follows: When it is desired to start the rotary transformer the switch 8 is closed, thereby completing a circuit for the control relay 46 from the positive side of a suitable control source through the contacts of switch 8, contacts 33 of the time relay 32, which is energized, conductor 53, closing coil 9 to the negative side of the control source. The energization of the coil 9 effects the operation of suitable means to connect the motor 2 to the supply circuit 3 to start the rotary transformer. A circuit is also completed for the coil of the relay 46 through contacts 45 of the temperature responsive device 44. The relay 46 by opening its contacts 54, opens the circuit of the time relay 32 which, however, is designed so that it does not open its contacts 33 until after it has been deenergized for a certain length of time. The closing of the contacts 55 of the relay 56 completes a circuit for the lowering relay 24 to cause the field rheostat 12 to be moved to its full resistance position if it is not already in that position. The circuit of the lowering relay is from the positive side of the control circuit through contacts of switch 8, contacts 33 of relay 32, conductor 53, contacts 55 of relay 46, conductor 56, auxiliary contacts 57 on the circuit breaker 7, conductor 58, contacts 59 of relay 23, conductor 60, coil of lowering relay 24 to the negative side of the control circuit. The relay 24 by closing its contacts 61 complete a circuit from the positive side of the control circuit, through the contacts 61, conductor 62, limit switch 63 on the field rheostat 12, field winding 64 and armature of motor 22 to the negative side of the control circuit. The motor 22, when its field winding 64 is energized operates the rheostat 12 to insert resistance in the generator field circuit until the limit switch 63 is opened and auxiliary contacts 65 are closed. The closing of the contacts 65 completes a circuit for the control relay 23 to open the above traced circuit for the lowering relay 24. The circuit of the relay 23 is from the positive side of the control circuit, through contacts of the switch 8, contacts 33 of the time relay 32, conductor 53, contacts 55 of the relay 46, conductor 56, coil of relay 23, conductor 66, contacts 65 on the rheostat 12 to the negative side of the control circuit. The relay 23 by closing its contacts 67, completes a locking circuit for itself which is independent of the auxiliary contacts 65 so that after the relay has been energized the rheostat 12 may be adjusted without effecting the deenergization of the relay 23.

As the rotary transformer increases its speed during the starting operation the voltage of the exciter 10 which is direct-connected thereto, increases. In order to accelerate the building up of the generator excitation the resistor 13 is short-circuited by the contacts 14 of the relay 15. When the exciter voltage reaches a predetermined value the exciter relay 16, the coil of which is connected across the brushes of the exciter, closes its contacts 68 and 69. The closing of the contacts 68 connects the coil of the relay 15 across the brushes of the exciter. The relay 15 opens the contacts 14 and inserts the resistor 13 into the generator field circuit.

The polarized relay 30, the coil of which is connected across the brushes of the exciter 10 operates to close its contacts 31 when the exciter voltage is a predetermined value if the exciter has a predetermined polarity.

It will be observed that when the generator voltage is less than the voltage across the load circuit 6, the contacts 70 of the relay 18 are closed. As soon as the relays 16, 23 and 30 have operated to close their respective contacts a circuit is completed through the contacts 70 to effect the raising of the voltage of the generator to a value slightly higher than the load circuit. This circuit is from the positive side of the control circuit, through the switch 8, contacts 33 of the relay 32, conductor 53, contacts 55, conductor 56, contacts 71, of relay 23, conductor 72, contacts 69 of relay 16, conductor 73, contacts 31 of relay 30, conductor 74, contacts 70 of relay 18, conductor 75, auxiliary contacts 76 on the circuit breaker 7, conductor 77, coil of raising relay 21 to the negative side of the control circuit. Relay 21 by closing its contacts 78 completes a circuit for the motor 22 so that the motor operates to increase the excitation of the generator. This circuit of the motor 22 is from the positive side of the control circuit, through contacts 78 of the relay 21, conductor 79, limit switch 80 on the rheostat 12, field winding 81 and armature of the motor 22 to the negative side of the control circuit. The motor continues to decrease the amount of resistance in the generator field circuit until the generator voltage is slightly higher than the load circuit voltage when the relay 18 closes its contacts 82 and completes a circuit from the closing coil 17 to close the circuit breaker 7. This circuit is from conductor 74, which is connected to the positive side of the control source in a manner heretofore described, through contacts 82 of relay 18, conductor 83, closing coil 17 to the negative side of the control circuit. The circuit breaker 7 in closing completes, through its auxiliary contacts 84, a locking circuit for its coil 17 which is independent of the contacts 82 of the relay 18.

The circuit breaker 7, by closing its contacts 86 completes a circuit for the coil of the time relay 32 to reenergize this relay. If the rotary transformer is in an operative condition and switching apparatus functions properly the time interval that elapses between the opening of the contacts 54 of the relay 46 and the closing of the auxiliary contacts 86 of the circuit breaker 7 is not long enough to permit the relay 32 to open its contacts 33 and effect the shutting down of the machine 1. The relay 32 is designed in any suitable manner so that if the time interval is for any reason, long enough to permit the relay 32 to open its contacts 33 and shut down the equipment, the relay contacts 33 remain in their open position until they are reset by hand.

The circuit breaker 7 by opening its auxiliary contacts 57 and 76, and closing its auxiliary contacts 85 transfers the control of the motor operated rheostat 12 from the relay 18 to the contact making voltmeter 35 and contact making ammeter 36 so that after the generator 5 is connected to the load circuit its voltage is maintained constant until the current output reaches a predetermined value at which value the current is maintained constant.

In case the voltage is below a predetermined value the contacts 87 and 88 of the voltmeter 35 are in engagement so that a circuit is completed for the raising relay 21 if the current output is below a predetermined value. This circuit is from conductor 56, which is connected in a manner heretofore described to the positive side of the control circuit, through auxiliary contacts 85, conductor 89, ammeter contacts 90, which are closed so long as the current output is below a predetermined value, conductor 91, contacts 87 and 88 of the voltmeter 35, conductor 77, coil of raising relay 21 to the negative side of the control circuit. Relay 21 effects an increase in the voltage of the generator 5 in the manner heretofore described.

In case the voltage is above a predetermined value the contacts 87 and 92 of the voltmeter 35 are in engagement so that a circuit is completed for the lowering relay 24 if the current output is below a predetermined value. This circuit is from conductor 89, which is connected in a manner heretofore described to the positive side of the control circuit, through ammeter contacts 90, conductor 91, voltmeter contacts 87 and 92, conductor 60, coil of lowering relay 24 to the negative side of the control circuit. Relay 24 effects a decrease in the voltage of the generator in the manner heretofore described.

In case the current output of the generator 5 exceeds a predetermined value relay 36 opens its contacts 90 and closes its contacts 93 thereby completing a circuit for the lowering relay 24 irrespectively of the voltage of the generator, so as to decrease the generator voltage in order to maintain the current output at said predetermined value. This circuit is from conductor 89 through ammeter contacts 93, conductor 94, contacts 95 of the reverse current relay 50, which are closed when current flows from the generator 5 to the load circuit 6, conductor 60, coil of relay 24 to the negative side of the control circuit. The value of current at which relay 36 opens its contacts 90 and closes its contacts 93 depends upon the amount of current through the winding 38, the circuit of which is completed across the control circuit when relay 46 closes its contacts 55. The resistors 42 and 51 in the circuit of the winding 38 are short circuited during the normal operation of the transformer 1. The relay 41, which short circuits the resistor 42 is energized at the same time winding 38 is energized. The resistor 51 is short circuited by the contacts 96 of the reverse current relay 50, which are closed at all times except when current flows from the load circuit to the generator. Such a reversal of current through the generator 5 may occur for example in case the load circuit 6 is a railway circuit supplying locomotives which are equipped with regenerative braking systems.

When the load supplied by the transformer 1 is such that the temperature thereof exceeds a predetermined value, temperature responsive device 39 opens its contacts 40 in the circuit of the control relay 41, which in turn opens its contacts 97 in the short circuit around the resistor 42, so that the resistor 42 is inserted in series in the circuit of the winding 38. The excitation of the winding 38 therefore is decreased so that the calibration of the relay 36 is changed in such a manner that the current output of the transformer 1 is held constant at a lower value.

However, if the temperature of the transformer continues to rise so that the temperature responsive device 44 opens its contacts 45, the circuit of the relay 46 is opened so that the relay is deenergized. The relay 46 by opening its contacts 55 opens the circuit of the closing coil 17 of the circuit breaker 7 so that the generator 5 is disconnected from the load circuit. The opening of the contacts 55 also removes the control of the raising and lowering relay 21 and 24 from the voltmeter 35 and ammeter 36. The closing of the contacts 54 of the relay 46 reestablishes the original circuit of the coil of the time relay 32 so that it maintains its contacts 33. The relay 46 by closing its contacts 98 completes a circuit of the lowering relay 24 to cause the motor 22 to insert all of the resistance of the rheostat 12 into the circuit of the generator field winding 11.

It will be observed therefore that the arrangement is such that when the relay 46 is deenergized in response to the opening of the contacts 45 of the temperature responsive device 44 the transformer runs light until it has cooled sufficiently to allow the device 44 to close its contacts 45. Relay 46 then becomes energized so that the relay 18 is operative again to equalize the generator and load circuit voltages and reconnect the generator to the load circuit in the manner heretofore described.

If the machine cools sufficiently to allow the contacts 40 of the temperature responsive device 39 to close, the relay 41 is again energized so that the ammeter 36 is recalibrated to its original value.

In case the transformer operates invertedly while it is in operation the reverse current relay 50 moves so as to open its contacts 95 and 96 and close its contacts 99. The opening of the contacts 96 removes a short circuit around the resistor 51 so that the ammeter is calibrated to hold a lower value of current than it normally does when the generator 5 is operating as a generator. The opening of the contacts 95 and the closing of the contacts 99 changes the connections of the ammeter contacts 93 so that when they are closed the circuit of the raising relay 21 is closed instead of the circuit of the lowering relay 24. Therefore, when the load on the transformer when operating invertedly tends to increase above a predetermined value the operation of the regulating equipment is reversed so that the field of the generator 5 is increased instead of decreased as it is when the generator is supplying current to the load circuit.

When it is desired to shut down the transformer the switch 8 is opened so that the heretofore traced circuits of the closing coil 9 of the circuit breaker 4, and the closing coil 17 of the circuit breaker 7 are opened to disconnect the transformer from the supply and load circuits. The circuit of the relay 46 is also interrupted so that the circuit of the time relay 32 is reestablished through the contact 54. The other control devices are restored to their normal position in a manner which will be obvious from an inspection of the drawing.

While I have in accordance with the patent statutes shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States, is:

1. In a system of electric distribution, a source of current, and current responsive means for controlling the current output of said source comprising a differential relay having two opposing windings, one of which is energized in accordance with the current output of said source, and means responsive to the temperature of said source for varying the excitation of the other winding of said relay.

2. In a system of electric distribution, an electric circuit, a dynamo electric machine connected to said circuit, and current responsive means for controlling the current flowing between said machine and circuit comprising a differential relay having two coils one of which is energized in accordance with the current flowing between said machine and said circuit, and temperature responsive means for controlling the energization of the other of said windings.

3. In a system of electric distribution, two electric circuits, a rotary transformer connected between said circuits and current regulating means arranged to maintain the current output constant at one value when energy is transferred from one circuit to the other and for maintaining current output constant at a different value when energy is transferred from said other electric circuit to said one circuit.

4. In a system of electric distribution, two electric circuits, a rotary transformer connected between said circuits, current regulating means arranged to maintain the load on said transformer below a predetermined value when energy is transferred from one of said circuits to the other, and a reverse current relay arranged to change the connections of said regulating means so that it operates to maintain the load on said transformer below a predetermined value when energy is transferred from said other of said circuits to said one of said circuits.

5. In a system of electric distribution, two electric circuits, a rotary transformer connected between said circuit, current regulating means for controlling the output of said transformer comprising a relay having a winding arranged to be energized in accordance with the current flowing between said transformer and one of said circuits, and means arranged to be operated in accordance with the direction in which energy is transferred between said circuits for controlling the operation of said current regulating means so that it operates to maintain the current output constant, irrespectively of the direction in which the energy is transferred between said circuits.

6. In a system of electric distribution, two electric circuits, a rotary transformer connected between said circuits, current regulating means for controlling the output of said transformer comprising a relay having a winding arranged to be energized in accordance with the current flowing between said transformer and one of said circuits, and means arranged to be operated in accordance with the direction in which energy is transferred between said circuits for controlling the operation of said current regulating means so that it operates to maintain the current output constant at one value when energy is transferred from one of said circuits to the other and the current output is maintained constant at another value when energy is transferred from said other circuit to said one of said circuits.

7. In a system of electric distribution, two electric circuits, a rotary transformer connected between said circuits, current regulating means for controlling the output of said transformer comprising a differential relay having two opposing windings one of which is arranged to be energized in accordance with the current flowing between said transformer and one of said circuits, means for exciting the other winding, and a reverse current relay for changing the excitation of said last mentioned winding whereby said current regulating means maintains the current output of said transformer below a predetermined value when energy is transferred from one of said circuits to the other and below another predetermined value when energy is transferred in the opposite direction between said circuits.

8. In a system of electric distribution, a supply circuit, a load circuit, a rotary transformer connected between said circuit, excitation controlling means for said transformer, and means arranged to be operated in accordance with a predetermined abnormal condition of said transformer to effect the disconnection of said transformer from said load circuit and the operation of said excitation controlling means to decrease the excitation of said transformer to a predetermined value without effecting the disconnection of said transformer from said supply circuit when said abnormal condition is above a certain value and for effecting the establishment of the normal excitation of said transformer and the connection of said transformer to said load circuit when said predetermined abnormal condition subsequently decreases below a predetermined value.

9. In a system of electric distribution, a supply circuit, a load circuit, a rotary transformer connected between said circuits, excitation controlling means for said transformer, and means responsive to the temperature of said transformer for effecting the disconnection of said transformer from said load circuit and the operation of said excitation controlling means to decrease the excitation of said transformer to a predetermined value without effecting the disconnection of said transformer from said supply circuit when the temperature of said transformer exceeds a predetermined value and for effecting the operation of said excitation controlling means to restore the excitation to its normal value and the connection of said transformer to said load circuit when the temperature of said transformer subsequently decreases below a predetermined value.

10. In a system of electric distribution, a supply circuit, a load circuit, a motor generator connected between said circuits, regulating means for controlling the excitation of the generator of said motor generator, and means responsive to the temperature of said motor generator for effecting the disconnection of said generator from said load circuit and the operation of said regulating means to decrease the voltage of said generator to a predetermined subnormal value when the temperature of said motor generator exceeds a predetermined value and for effecting the operation of said regulating means to increase the excitation of said generator and the connection thereof to said load circuit when the temperature of said motor generator subsequently decreases below said predetermined value.

In witness whereof, I have hereunto set my hand this 25th day of June, 1926.

BENJAMIN S. WEINFIELD.